W. H. LEAVITT.
TYING DEVICE FOR HAY BALES OR PACKAGES.
APPLICATION FILED JUNE 15, 1909.

953,211.

Patented Mar. 29, 1910.

2 SHEETS—SHEET 1.

Witnesses
A. J. Shelton.
V. O. Nabors.

Inventor
William H. Leavitt.
By Z. P. Dederick,
Attorney

W. H. LEAVITT.
TYING DEVICE FOR HAY BALES OR PACKAGES.
APPLICATION FILED JUNE 15, 1909.

953,211.

Patented Mar. 29, 1910.

2 SHEETS—SHEET 2.

WITNESSES
Chas. N. Davies
M. E. Moore

INVENTOR
Wm. H. Leavitt
By J. P. Dederick
Attorney

UNITED STATES PATENT OFFICE.

WILLIAM H. LEAVITT, OF STAMFORD, TEXAS.

TYING DEVICE FOR HAY BALES OR PACKAGES.

953,211. Specification of Letters Patent. Patented Mar. 29, 1910.

Application filed June 15, 1909. Serial No. 502,398.

*To all whom it may concern:*

Be it known that I, WILLIAM H. LEAVITT, a citizen of the United States, residing at Stamford, in the county of Jones and State of Texas, have invented certain new and useful Improvements in Tying Devices for Hay Bales or Packages, of which the following is a specification.

This invention relates generally to a tying device for hay presses, the object being to provide an exceedingly simple and highly efficient device consisting of few parts, all of simple construction, by means of which the hay can be automatically bound and tied by wire while passing through the press box in the process of baling; and with these objects in view the invention consists in the novel features of construction and combination of parts shown in the annexed drawings to which reference is hereby made and hereinafter particularly described and finally recited in the claims.

Figure 1:
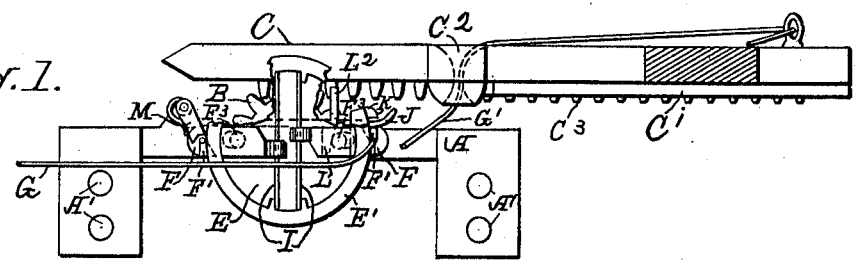
Figure 2:
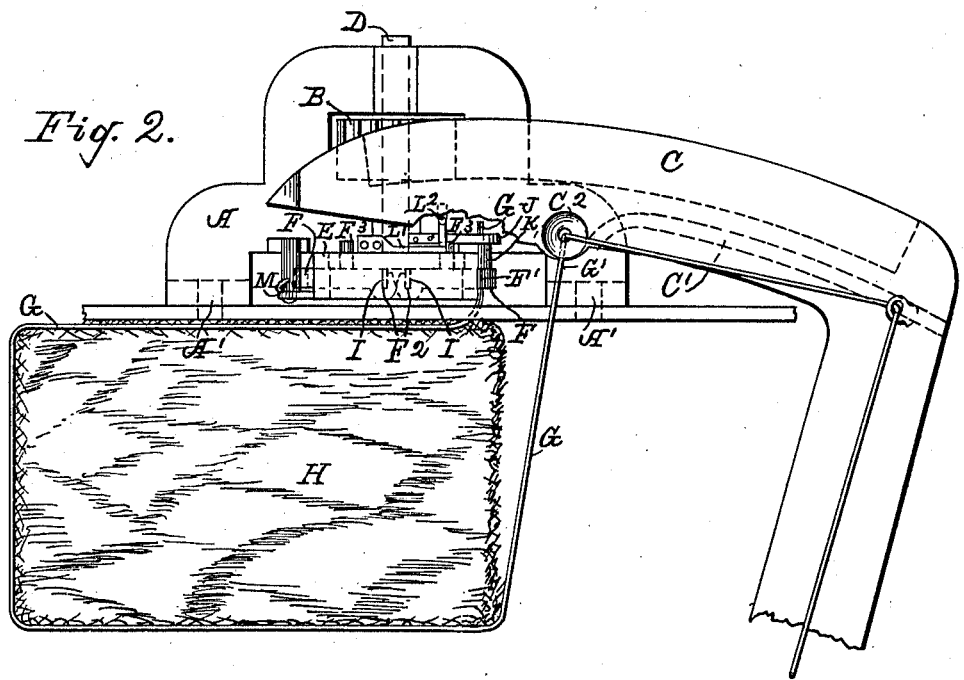
Figure 6:
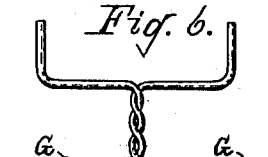
Figure 7:
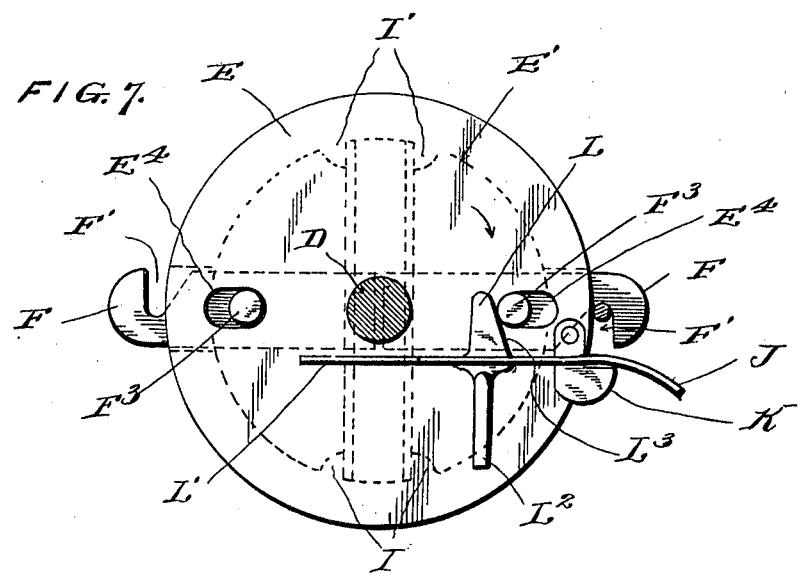
Figure 8:
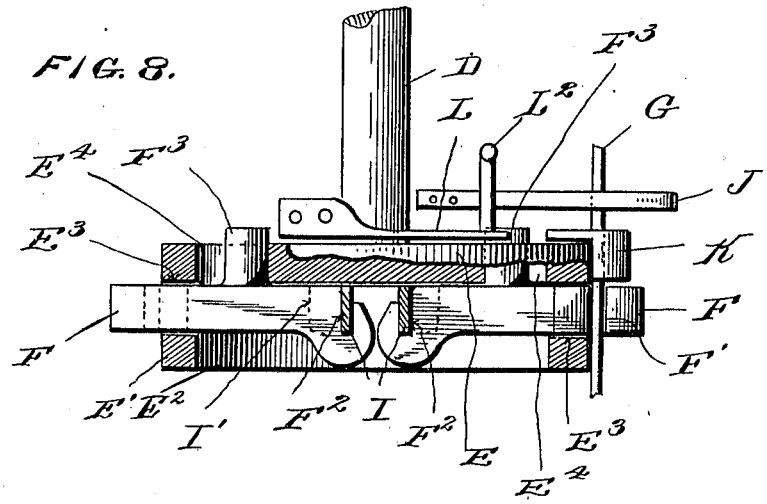

Referring to the drawings in which similar reference letters designate like parts in the several views; Figure 1, represents a side elevation of the tying mechanism, with the parts in the position they occupy after the wire has been laid by the needle and action commenced by the wire-twisting disk; a portion of said disk being broken away. Fig. 2 is a top plan view of the same. Figs. 3, 4, 5, and 6 are enlarged detail views respectively of the wire gripping jaws, knife block, wire releasing shifter, and a tie as effected by the device. Fig. 7 is a view of the twisting disk and connections showing the reverse side of Fig. 1. Fig. 8 is an edge view of Fig. 7, part of the disk being broken away for convenience of illustration, and omitting the frame.

A is a frame, of metal, which supports the tying device, and is fastened to the side of a hay baler by bolts passing through bolt holes $A'$, in such a way as to present the cogs of the pinion B to be acted upon by cogs $C^3$, on the lower side of the needle bar C, to give proper motion to the pinion B, and through it to the several parts as will be more fully hereinafter described.

The shaft D passes laterally through bearings in casting or frame A, and is journaled therein. Upon the inner end of the shaft is secured the wire twisting disk E, which is rotated with said shaft through the medium of pinion B. The pinion is rotatable in forward and reverse direction as actuated by the rack teeth or cogs $C^3$ on the needle bar, and serves to operate the working parts of the device in tying a bale. The twisting disk $E'$ is formed with an annular rim or upturned flange $E^2$ which is slotted at the diametrically opposite points $E^3$ for the accommodation of the pair of gripping jaws F F which fit loosely in the slots and are movable therein on radial lines toward and away from the center of the disk. Each jaw F is fashioned with a V-shaped notch or recess $F'$ to receive and retain the ends of the wire band G which is to be wrapped around the bale H, and its ends twisted by the twisting disk.

In Fig. 2 the band G is clearly shown in position on the bale ready for the operation of tying, one end being held in a jaw F, and the uncut portion being passed through and held in the eye $C^2$ of the needle bar C, from which it extends to the spool or other source of supply.

Figure 3:
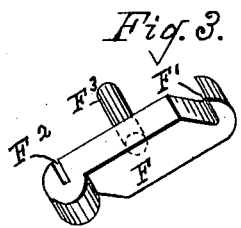
Figure 4:
Figure 5:
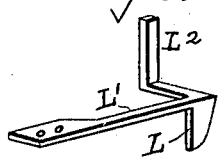

Referring to Fig. 3 the construction of the gripping jaws is clearly seen. At the opposite end of the jaw F to that in which the notch $F'$ is formed is a slot $F^2$, said end being the inner end of the jaw, while secured in the jaw intermediate its length is a lug or pin $F^3$. The jaws are guided in slots $E^3$ by means of the pins $F^3$ which are movable in the slots $E^4$ of the disk, and a spring I, over which the inner recessed end of each jaw extends, exerts its tension to pull and hold the jaw in retracted position toward the center of the disk. The springs I are held in place by means of the lugs or shoulders $I'$ on the inner periphery of the flange of the disk. The underside of the needle bar C is formed with a curved rib or ledge $C'$ fashioned with an abrupt turned end, and this ledge or rib, in connection with the wire shifter or releasing device $L'$ (which in normal position holds the spring I distended and a jaw in a non-gripping position) permits the jaw to grip the wire when the action of the curved ledge lifts the releasing lug or device $L'$ free of the jaw. This shifter $L'$ is of elastic or spring metal and is secured to the frame A at one end, its free end being formed with a lug L having the inclined engaging face or edge $L^3$ and an angle arm $L^2$, which latter extends into the path of movement of the rib or ledge ·$C'$ on the needle bar. With the parts in required position, the engagement of the rib (as the needle bar oscillates or swings in the arc of a circle,) with the arm lifts the lug L away from the disk E and jaws F. As shown in Fig. 7 the inclined edge L³ of the lug on the shifting device is in contact with a pin F³ of one of the jaws, and continued movement of the disk in the direction of the arrow, will force the pin F³ outwardly in slot E⁴, thus moving the jaw to the right against the tension of spring I and releasing the wire from the engagement between the jaw and the edge of the disk. The engagement of arm L² with rib C' on the needle bar will lift the lug out of the path of pin F³, thus permitting the spring I to pull the jaw toward the center of the disk, causing the wire to be gripped and held between the recessed jaw and the edge of the disk as the twisting disk is rotated.

The length of wire to be used as a band for the bale is clipped or cut from the supply as the disk rotates which movement carries the wire against a cutting block K which is firmly attached to the frame A. The spring J, also fastened to the frame A, obstructs and holds the wire and the rotary movement of the disk forces the wire against the cutting edge of the block K, severs the length which constitutes the band. As the disk rotates one of the jaws grips the free end of the wire and holds the wire against the edge of the disk, the spring I acting on the jaw to this end. The continued movement of the disk brings the other jaw around to position where the inclined edge of lug L bears against the pin F³ and forces the jaw outwardly. At this point the movement of the needle bar to the right forces the portion G' of the wire into the recess of the free jaw beneath the spring J. The ledge on needle bar C now strikes the angle arm L² of the shifting lug and lifts it out of engagement with the pin F³, permitting the spring I to draw the jaw inwardly and hold the wire against the edge of the disk. The wire is then severed as described by the knife K, and the continued revolution of the disk twists the ends of the wire, as shown in Fig. 6. The reverse movement of the needle bar, to the right, revolves the disk in an opposite direction. As the disk rotates, the respective ends of the twisted wire are forced from the recesses F' as they contact with the spring pressed dog or stripper M, which is held in position in the path of movement of the wire ends, as seen in Fig. 1.

The device herein described can be made in suitable sizes for binding packages of letters or other articles.

Having thus described my invention, what I claim as new, and desire to secure by Letters Patent of the United States, is—

1. A device of the class described comprising a needle bar provided with cogs on the lower side thereof, a shaft and pinion arranged in a frame work below said needle bar in a manner enabling the pinion to engage the toothed portion of the bar, a disk secured to the inner end of the pinion shaft, said disk being provided with movable wire gripping jaws, and means for operating the jaws in connection therewith, to receive and grip the band, as set forth.

2. A tying device for hay bales or packages, comprising a needle bar having a ledge and cogs on the lower side thereof, a journaled pinion arranged directly beneath the toothed needle portion and rotated by the same, a releasing shifter having an upward projection to contact with the ledge, for regulating the reception and gripping of the wire band, means for twisting the ends of, and a stripper for removing the twisted wire ends from the jaws, as set forth.

3. The combination with a disk and a pair of gripping jaws therefor, of a pinion connected to the disk shaft, and means for rotating the pinion and disk, first forwardly and then backwardly, substantially as described.

4. In a device of the class described comprising a needle bar having cogs on its lower side, a cast frame beneath the bar having bearings for a laterally disposed shaft, a pinion secured intermediately between the bearings in a position admitting the toothed portion of the bar to move into engagement with, and rotate the pinion, a disk secured to the end of the shaft, gripper jaws slidably located within the disk, springs within the disk, to hold the jaws in contact with the ends of the wire to be twisted, a block against which the gripped wire end that passes around the bale contacts and is severed, a spring catch on the frame to hold the other wire end that passes through eye of needle and thence to the spool, a shifter having an upper extension that comes into engagement with a ledge on the needle bar, and while in such contact permitting the gripper jaws to retain their hold on the wires, and a wire releasing or stripping device to remove the twisted ends from the jaws, substantially as specified.

In testimony whereof I affix my signature in presence of two witnesses.

WILLIAM H. LEAVITT.

Witnesses:
A. J. SHELTON,
V. O. NABORS.